United States Patent [19]

Friggstad

[11] Patent Number: 4,664,008
[45] Date of Patent: May 12, 1987

[54] HYDRAULIC PUNCHING AND SHEARING TOOL

[75] Inventor: Terrance Friggstad, Saskatoon, Canada

[73] Assignee: Talon Tool Corp., Frontier, Canada

[21] Appl. No.: 830,968

[22] Filed: Feb. 19, 1986

[51] Int. Cl.$^4$ ............................ B26D 5/12; B26D 9/00
[52] U.S. Cl. ........................................ 83/549; 83/598; 83/605
[58] Field of Search .................. 83/549, 515, 598, 605

[56] References Cited

U.S. PATENT DOCUMENTS

| | | | |
|---|---|---|---|
| 316,420 | 4/1885 | Tydeman | 83/515 |
| 988,976 | 4/1911 | Coon | 83/515 |
| 1,736,559 | 11/1929 | Vollrath | 83/515 X |
| 4,567,800 | 2/1986 | Carboniero | 83/549 X |

Primary Examiner—Frank T. Yost
Attorney, Agent, or Firm—D. Ron Morrison

[57] ABSTRACT

A combination tool for punching and/or shearing metal has pivotally mounted punch and die set on one end of a working bed and a shear blade pivotally mounted on the other end of the bed, with an hydraulic ram centrally mounted above and between them to apply force to either or both simultaneously. Furthermore, both can easily and quickly be pivotally displaced to permit optional application of the hydraulic ram to pressing, braking, or forming operations on the bed under the ram, using auxiliary equipment.

5 Claims, 5 Drawing Figures

HYDRAULIC PUNCHING AND SHEARING TOOL

This invention relates to a combination tool and more particularly to an hydraulically powered tool having provisions for the multiple operations of punching and shearing metal and optionally pressing or forming (braking).

The art of punching and shearing metal is well developed, and numerous machines have been designed to carry out, individually and separately, or simultaneously in combination, these two operations, both of which require the application to the metal of considerable force. Early in the art the machines utilized systems of levers to obtain the mechanical advantage required to punch and shear metal manually. Later machines have utilized hydraulic cylinders or combinations of hydraulic cylinders and levers to achieve the tremendous forces desired for application to bigger and tougher metal punching and shearing operations.

The present invention has been developed to utilize the precision and convenience available with the application of great forces by an hydraulic cylinder, in combination with some leverage action, for a relatively small, versatile combination tool that can be operated as a shearing tool or as punching tool or as both simultaneously or, optionally in lieu of any of the foregoing, as a pressing tool or braking tool.

The elements of this combination tool are arranged so that it can be converted almost instantaneously from one type of tool to another, viz: from a shearing tool to a punching tool or vice-versa, or to a combination of both, or to a pressing tool or braking tool.

The present invention thus comprises a combination tool hydraulically powered to perform metal punching and metal shearing operations comprising:
 (a) a reinforced work bed having recesses therein for firm simultaneous retention of a die for a metal punching operation and a fixed blade of a metal shearing operation,
 (b) an "A" frame mounted on the bed integrally therewith to support an hydraulic cylinder vertically over the center of the bed,
 (c) a punch arm mounted pivotally near one end of the bed to pivot manually from an inoperative position clear of the bed to an operative position under the hydraulic cylinder with a punch thereon aligned vertically over a punch die in one of said recesses,
 (d) a shear arm carrying a shear blade and mounted pivotally near the other end of the bed, to pivot manually from an inoperative position clear of the bed to an operative position under the hydraulic cylinder, said operative position aligning said shear blade with a fixed shear blade mounted in another of said recesses, said punch arm and shear arm both being arranged to be operable in their operative positions both with and without the simultaneous operation of the other in its operative position.

The invention may be more readily understood from the following description thereof, with reference to the accompanying drawings in which like characters of reference indicate corresponding parts in the different figures and:

Figure 1:
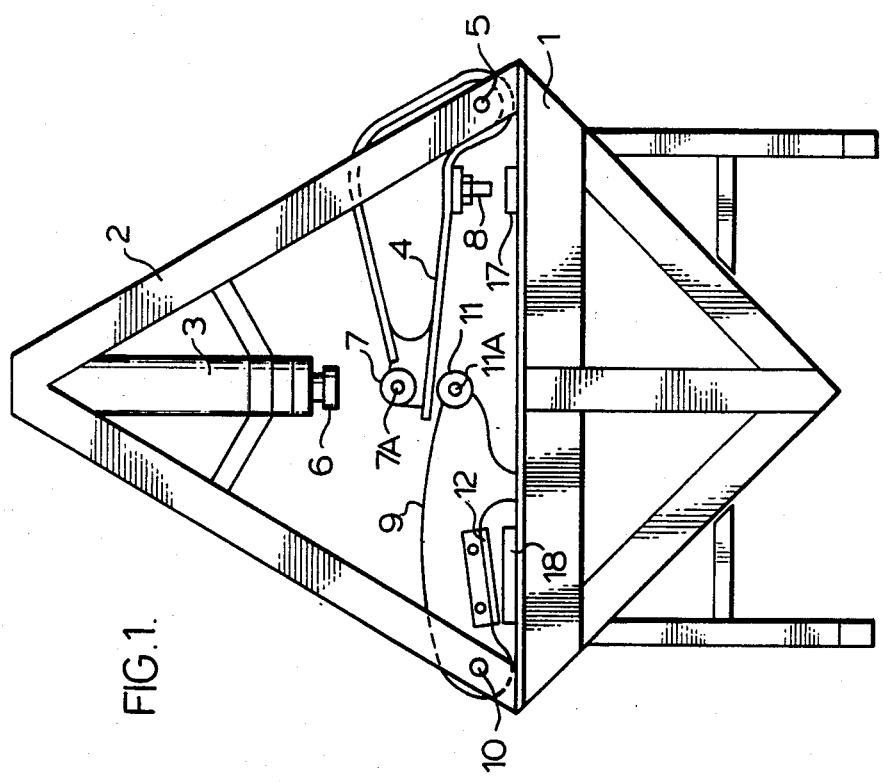
FIG. 1 is a front elevation of an embodiment of the invention having a shearing tool on the left side of the figure, a punching tool on the right side, and its hydraulic cylinder centrally located between these two.
Figure 4:
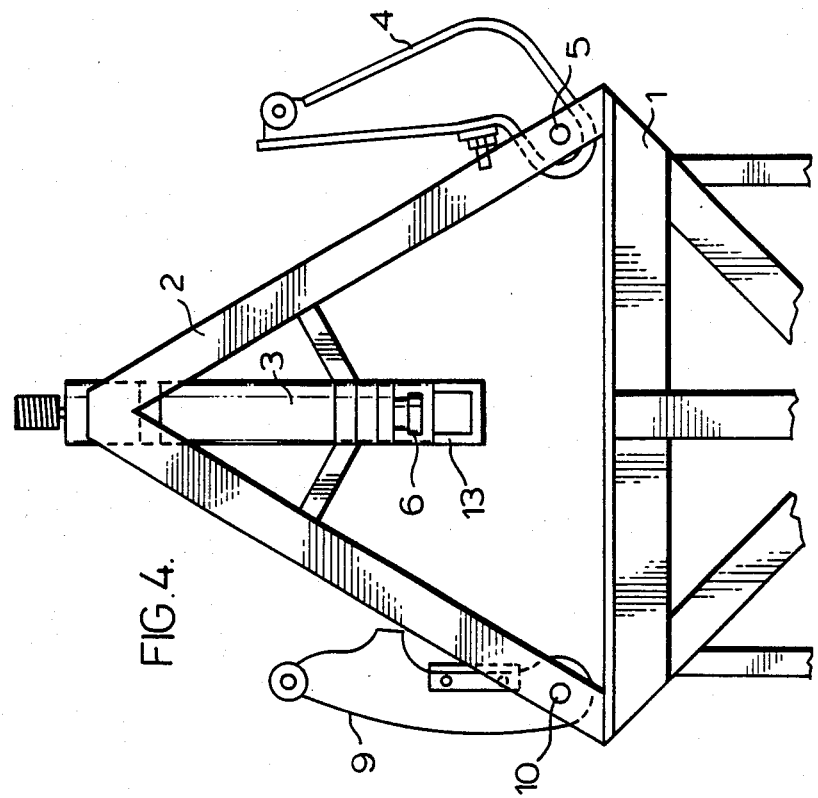
FIG. 4 is another front elevation of the upper part of the embodiment of FIG. 2 with the shearing and punching tools displaced to the "clear" position and the platen in position for a pressing operation.
Figure 3:
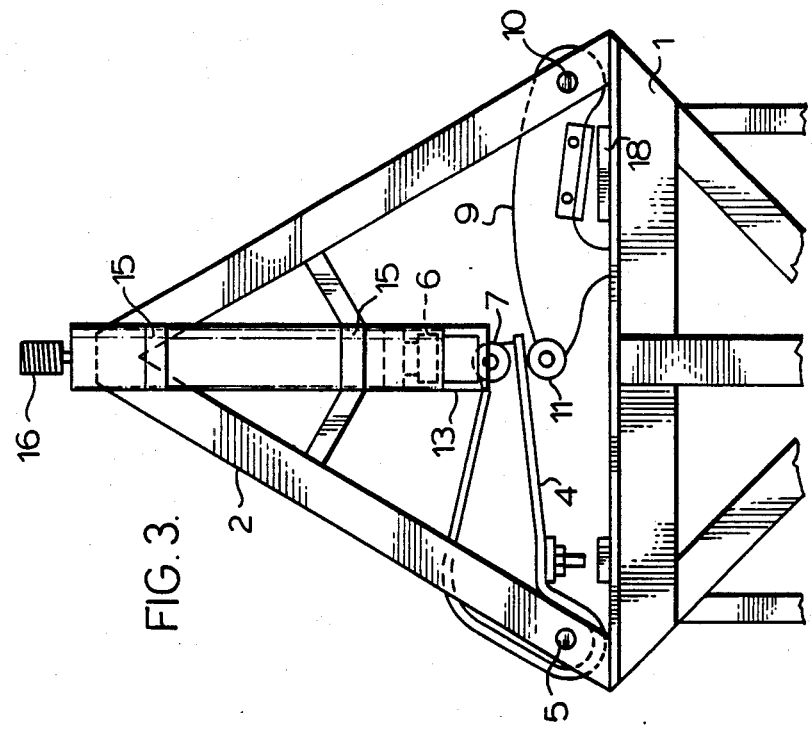
FIG. 3 is a rear elevation of the upper part of the embodiment of FIG. 2 showing more details of the construction of the platen.

Referring now to the details of the drawings, in FIG. 1 the reinforced work surface or work bed of the combination tool is designated as 1, and integral with this is an "A" shaped upper frame 2, located above the bed, the whole being supported at a convenient work height, e.g. by conventional leg supports. Mounted vertically in the upper frame is an hydraulic cylinder 3, located centrally above the bed. A punching tool or punch arm 4 is pivotally mounted at or near one end of the bed, pivot pin 5 indicating this mounting. The mounting is arranged so that the punch arm can be pivoted, manually and quickly, from an operating position, as shown in this figure, to a clear position as shown in FIG. 4. The ram 6 from hydraulic cylinder 3 extends to bear on punch arm 4 at roller 7 and operate the punch 8. Shear arm 9 is pivotally mounted at or near the opposite end of the bed from the punch arm, pin 10 indicating its pivot mounting. This mounting likewise is arranged so that the shear arm can be pivotted, manually and quickly, from its operating position as shown in FIG. 1 to a clear position as shown in FIG. 4. Roller 11 on shear arm 9 aligns under ram 6 simultaneously with operation of the punch arm, or independently thereof when the latter is pivotted to the clear position. Alternatively, shear arm 9 can be pivotted to the clear position and punch arm 4 operated independently thereof by extension of ram 6 and, as a further alternative, both arms can be pivoted to the clear position and the hydraulic cylinder and ram brought to bear on a platen for general press work on the cleared area of the bed.

Figure 2:
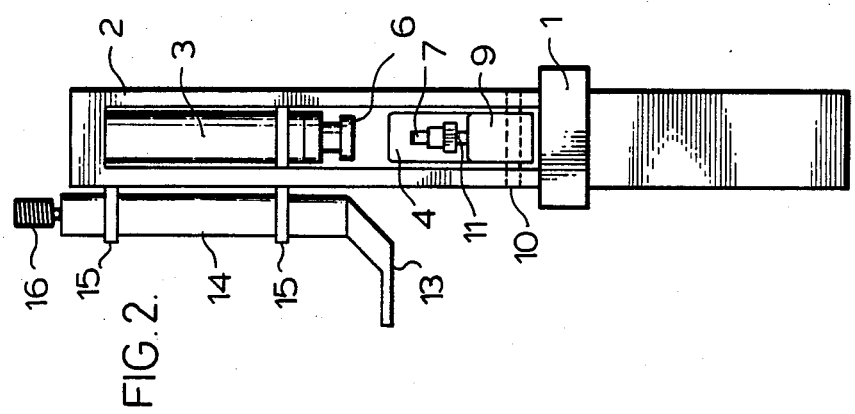
FIG. 2 is a left side elevation of the embodiment of FIG. 1 and including the optional feature of a platen for use in pressing operations, located in the "clear" position at the back of the embodiment, and not shown in FIG. 1.

In FIG. 2, the convenient mounting of an optional feature is shown; the figure also illustrates the relatively narrow construction which is adequate for the invention when using an "A" shaped upper frame for mounting the hydraulic cylinder over the work bed. The optional feature shown is a platen, 13, which can be used under the hydraulic cylinder for simple pressing operations on the work bed, or mounting of a brake tool or forming tool. The platen is mounted rigidly at the bottom of a heavy circular pipe, 14, which is journalled through two rings, 15, mounted rigidly on the upper frame 2 so that the pipe can rotate in and slide through the rings. The pipe is suspended from a counter-balance spring, 16, so that with the shear and punch arms in the clear position the pipe can quickly be rotated to place the platen 13 directly under the ram 6 and a pressing operation started. Similarly, this equipment can be used for simple forming or braking operations by setting forms or appropriate forming or braking tooling on the work bed for forming metal in the forms between the ram or platen and the bed.

Returning to FIG. 1, dies are mounted on plate 17 which fits on work bed 1 under punch 8, and can easily be restrained as necessary for repeated operation of the punch, or removed, or replaced by alternate dies for various size punches. Similarly, punch 8 can readily be replaced by alternate size punches, as required for various punching operations. In like manner, at the other end of the working bed under shear blade 12 a lower shear blade or die 18 is removeably mounted in another recess or socket in the bed from which it can quickly be received; positioning of the lower blade in relation to the upper blade for cutting action can be achieved accurately by adjusting bolts or other suitable means cooperating with the socket.

The rollers 7 and 11 on the punch arm and shear arm respectively, directly below the ram, are arranged to transmit downward pressure applied by the ram 6 to either the punch arm, or the shear arm, or both with one on top of the other, and are capable of rotating on their respective roller pins 7A and 11A. The rotation of the rollers precludes sideways or lateral displacement of the arm as it bears down on the rollers when the punch arm or shear arm pivots on pivot pin 5 or 10 respectively. The rollers ensure that the punch arm and shear arm pivot on their pivot pins under pressure from the ram without undersirable lateral force being applied to the ram as it operates the punch or shear or both simultaneously.

Figure 5:
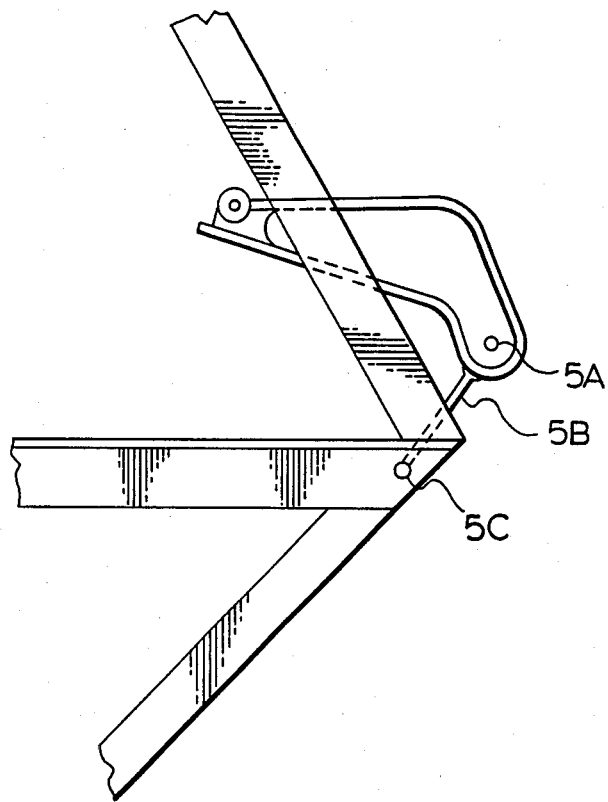
FIG. 5 is a partial front elevating of an alternative arrangement having a double pivot system for pivoting the punch arm.

Instead of pivot pin 5 of the punch arm being mounted in a leg of the "A" frame as shown in FIG. 1, an alternative arrangement as shown in FIG. 5 may be preferred, to provide greater ease for pivotting the punch arm to the clear position. In such arrangement the punch arm 4 pivots on a replacement pivot pin 5A equivalent to pin 5 but mounted in one end of a rigid short, moveable link 5B, with the distal end of the link being mounted to pivot on a secondary pin 5C fastened in or near the adjacent punch arm end of the bed. This double pivot system facilitates moving the punch arm manually between the operating position and the clear position, as there is an additional center of rotation about which the punch arm can be moved in manoeuvering it.

When it is desired to use the equipment for pressing, forming, or braking operations, the punch arm and shear arm are pivotted to their respective clear positions and the bed is cleared of the punch die and the lower shear blade, leaving the bed free for positioning of any desired dies or forms, directly under the ram, for braking, forming, or pressing. If desired, the platen can be swung into position under the ram from its clear position behind the "A" frame, providing a larger surface for application of the force of the ram against whatever is placed on the bed under the arm. Dies for braking and forming can be placed on the bed and positioned in conventional manner appropriate to the forming or braking operation to be performed.

The hydraulic cylinder used to apply force to the platen or the punch and shear arms can be any conventional, commercially available type of cylinder. The pump for driving the hydraulic fluid for the cylinder can most conveniently be driven by an electric motor. The pump controls for advancing and withdrawing the ram can be connected to be operated from one or more (for safety reasons preferrably several) locations around the combination tool, and preferably provide for both manual and pedal operation of the controls. These all can be conventional accessories.

To illustrate part of the scope of operation attainable with equipment of convenient size using commercially available units for conventional parts, a combination tool in accordance with the invention was fabricated having a bed length of 1.6 meters and an "A" frame 1.7 meters high mounted thereon. A 15.2 cm diameter commercially available hydraulic cylinder having a 7.6 cm diameter solid shaft ram with a 40 cm stroke was solidly mounted in the "A" frame and powered by a remote 2.25 kw electrically driven pump. A punch arm was pivotted at one end of the bed and a shear arm at the other, as generally illustrated in FIG. 1. With an hydraulic pressure rates at 17,200 KPa, the ram was capable of application of 31,750 kg in braking operations, of 68,000 kg in shearing operations, and 90,700 kg in punching operations. These capabilities allowed the shear to cut mild steel up to 1.25 cm by 15.25 cm and the punch to punch holes up to 2.7 cm diameterl through 1.25 cm mild steel.

Numerous modifications can be made in the various expedients described without departing from the invention, the scope of which is defined in the following claims.

What is claimed is:

1. A combination tool hydraulically powered to perform metal punching and metal shearing operations comprising:
   (a) a reinforced work bed having recesses therein for simultaneous retention of a die for a metal punching operation and a fixed blade of a metal shearing operation, respectively,
   (b) an "A" frame mounted on the bed integrally therewith rigidly to support an hydraulic cylinder vertically over the center of the bed, said cylinder projecting its ram vertically downwards,
   (c) a punch arm mounted pivotally near one end of the bed to pivot manually from an inoperative position clear of the bed to an operative position under the hydraulic cylinder with a punch thereon aligned vertically over a punch die in one of said recesses,
   (d) a shear arm carrying a shear blade and mounted pivotally near the other end of the bed, to pivot manually from an inoperative position clear of the bed to an operative position under the hydraulic cylinder, said operative position aligning said shear blade with a fixed shear blade mounted in another of said recesses, said punch arm and shear arm both being arranged to be operable in their operative positions, through application of downward pressure thereon by said hydraulic cylinder, both with and without the simultaneous operation of the other in its operative position.

2. A combination tool as claimed in claim 1, adapted for pressing and forming operations and further including a platen mounted at the bottom of a vertically aligned, slidable, rotatable mounting, said mounting being;
   (a) a rotatable to move said platen from an operative position under said hydraulic cylinder to an inoperative position clear of said work bed and,
   (b) slidable to move the platen vertically.

3. A combination tool as claimed in claim 2 wherein said mounting is attached to the "A" frame and includes a counter-balance to retain it normally in a raised position.

4. A combination tool is claimed in claim 3 and including a roller mounted on each of the punch arm and shear arm respectively, directly below the ram, arranged to rotate while transmitting downward pressure applied to the respective arms by said ram as they rotate about their respective pivots, whereby lateral displacement of the ram is precluded.

5. A combination tool as claimed in claim 4, wherein the punch arm pivots on a pivot pin mounted in one end of a rigid, short, moveable link, the distal end of link being mounted to pivot on a secondary pin near the adjacent end of the bed.

* * * * *

UNITED STATES PATENT AND TRADEMARK OFFICE
CERTIFICATE OF CORRECTION

PATENT NO. : 4,664,008

DATED : May 12, 1987

INVENTOR(S) : Terrance Friggstad

It is certified that error appears in the above-identified patent and that said Letters Patent is hereby corrected as shown below:

On the title page item [21] Appl. No.: should read --830,988--.

Signed and Sealed this

Twenty-fifth Day of August, 1992

Attest:

DOUGLAS B. COMER

*Attesting Officer*  *Acting Commissioner of Patents and Trademarks*